United States Patent [19]
Machida et al.

[11] Patent Number: 5,655,171
[45] Date of Patent: Aug. 5, 1997

[54] ULTRAMINIATURE LENS SHUTTER CAMERA AND LENS BARREL THEREOF

[75] Inventors: Kiyosada Machida, Urawa; Tomoki Nishimura, Kawasaki, both of Japan

[73] Assignee: Nikon Corporation, Tokyo, Japan

[21] Appl. No.: 379,955

[22] Filed: Jan. 27, 1995

[30] Foreign Application Priority Data

Feb. 2, 1994 [JP] Japan .................................. 6-011135
Feb. 2, 1994 [JP] Japan .................................. 6-011136

[51] Int. Cl.⁶ .................................................. G03B 3/00
[52] U.S. Cl. .................................... 396/535; 396/542
[58] Field of Search ................................ 354/485, 288, 354/408

[56] References Cited

U.S. PATENT DOCUMENTS 4,860,039  8/1989  Hata et al. .......................... 354/106
4,951,083  8/1990  Okura et al. .
5,012,273  4/1991  Nakamura et al. .
5,051,764  9/1991  Nomura .
5,079,577  1/1992  Nomura .
5,231,449  7/1993  Nomura .
5,361,116  11/1994 Funahashi ........................... 354/403

*Primary Examiner*—David M. Gray
*Assistant Examiner*—Eric Nelson

[57] ABSTRACT

A lens shutter camera has light emitting and receiving sections for obtaining distance information. An optical section for performing photometry in an object field is disposed in a space between the light emitting and receiving sections in an optical axis direction. An electric plate passes the space between the light emitting and receiving sections in the optical axis direction and electrically connects a shutter section provided in a lens barrel and a control section provided outside the lens barrel.

13 Claims, 8 Drawing Sheets

ULTRAMINIATURE LENS SHUTTER CAMERA AND LENS BARREL THEREOF

BACKGROUND OF THE INVENTION

1. Field of the Invention

The present invention relates to an ultraminiature camera and a lens barrel thereof and more particularly relates to a lens shutter camera with range finding sections and a light measuring section and a lens barrel suitable therefor.

2. Related Background Art

FIG. 8 is a front view of a conventional lens shutter camera. A containing section 16d as a space for containing a flexible plate 17 is provided on the upper side of a lens barrel approximately correspondingly to an optical axis 20. Also, an AF light emitting section 16b and an AF light receiving section 16c for measuring a distance to an object are disposed so as to interpose the containing section 16d between them. Further, an AE optical section 16a for photometry, a finder section 21 for observing an object field and a flashlight emitting section 22 for emitting flashlight are arranged next to (right side in the drawing) the AF light receiving section 16c.

Thus, in the conventional camera, the AF light emitting and receiving sections 16b, 16c, the AE optical section 16a, the finder section 21 and the flashlight emitting section 22 are arranged laterally in a line, so that the breadth S2 of the camera is approximately determined due to the dimensions of these components.

But, in order to miniaturize the camera, the areas other than the containing section 16d between the AF light emitting and receiving sections 16b, 16c have been so far reduced in breadth.

However, in this case, when the base length between the AF light emitting and receiving sections 16b, 16c (the distance between them) is shortened, range finding ability of the AF light emitting and receiving sections 16b, 16c is lowered.

Also, there is a known lens shutter camera having a lens barrel with a zooming function in which a shutter unit is provided on the side of a movable cylinder of the lens barrel; its control section is provided on the side of a stationary cylinder thereof; and the shutter unit and the control section are connected by a FPC (flexible printed circuit). As the movable cylinder of the lens barrel is shifted in the optical axis direction in a zooming operation, the length of the FPC is set such that the shutter unit and the control section will not be pulled by the FPC when the shutter unit is located farthest away from the control section (telescopic end condition). Then, when the movable cylinder is located on the wide-angle side, the FPC slackens. Therefore, it is necessary to provide a space for containing the slackened FPC.

However, the provision of such space causes the size of the camera and the lens barrel to be enlarged, making it impossible to miniaturize the camera. That can be said still more in collapsible mount type cameras and cameras in which the distance between the telescopic end and the wide-angle end is large, as the moving distance of the movable cylinder in the optical axis direction is long. Further, if the slackened FPC is not contained in the space properly, an excessive load is applied to the FPC.

SUMMARY OF THE INVENTION

It is an object of the present invention to provide an ultraminiature lens shutter camera and a lens barrel therefor in which the above problems are solved and miniaturization is achieved.

It is another object of the present invention to provide an ultraminiature lens shutter camera and a lens barrel therefor in which the breadth of the camera is reduced without shortening the base length between range finding sections (AF light emitting and receiving sections).

In order to achieve the above objects, according to a first aspect of the present invention, a lens shutter camera has a pair of range finding sections for obtaining distance information; a light measuring section disposed in a space between the pair of range finding sections in an optical axis direction for performing photometry in an object field; and an electric plate passing the space between the pair of range finding sections in the optical axis direction and electrically connecting a shutter section provided in a lens barrel and a control section provided outside the lens barrel.

Thus, the light measuring section and the electric plate are disposed within the space between the pair of range finding sections in the optical axis direction, so that the breadth of the camera can be reduced without shortening the base length between the pair of range finding sections.

It is an object of the present invention to provide a lens barrel of a lens shutter camera having a zooming function and a collapsing function in which miniaturization is achieved by preventing an electric plate from being slackened in zooming and collapsing operations so as not to necessitate a space for containing the slackened electric plate, and an excessive load is prevented from being applied to the electric plate by disposing the electric plate always in a predetermined position.

In order to achieve the above object, according to a second aspect of the present invention, a lens barrel of a lens shutter camera has: an outer cylinder having an opening portion elongated in an optical axis direction; an intermediate cylinder engaged with the inside of the outer cylinder, the intermediate cylinder being shifted with respect to the outer cylinder in the optical axis direction; an inner cylinder supporting a photographic optical system and being engaged with the inside of the intermediate cylinder, the inner cylinder being shifted relatively with respect to the intermediate cylinder in the optical axis direction, the amount of the relative shift of said inner cylinder being approximately identical to the amount of the shift of the intermediate cylinder with respect to the outer cylinder in the optical axis direction; and an electric plate connecting the inside of the inner cylinder and the outside of the outer cylinder, the electric plate passing an area close to an end portion of the intermediate cylinder on the side of an image plane, the opening portion of the outer cylinder, and an area outside the outer cylinder corresponding to the area close to the intermediate cylinder on the side of the image plane in a state with the intermediate cylinder projected maximally.

According to the second aspect of the present invention, when the inner and intermediate cylinders are shifted in the optical axis direction in the zooming or collapsing operation, the amount of shift of the intermediate cylinder with respect to the outer cylinder becomes approximately identical to the amount of relative shift of the inner cylinder with respect to the intermediate cylinder. Therefore, the length of the route of the electric plate from the inside of the inner cylinder to the outside of the outer cylinder is not changed. Also, the electric plate is disposed always in a predetermined position.

DETAILED DESCRIPTION OF THE PREFERRED EMBODIMENTS

Figure 1:
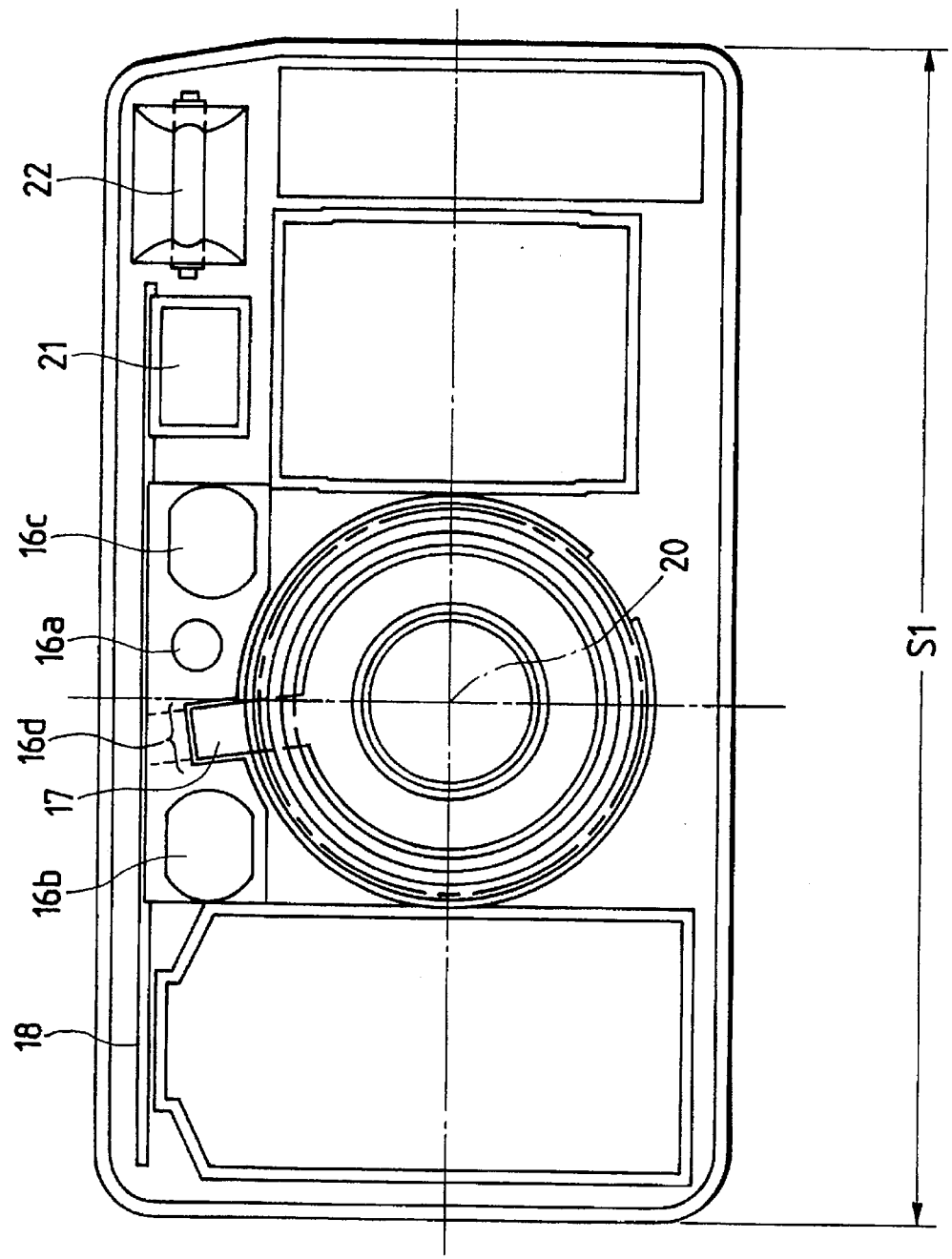
FIG. 1 is a schematic front view showing the structure of a lens shutter camera according to an embodiment of the present invention.
Figure 2:
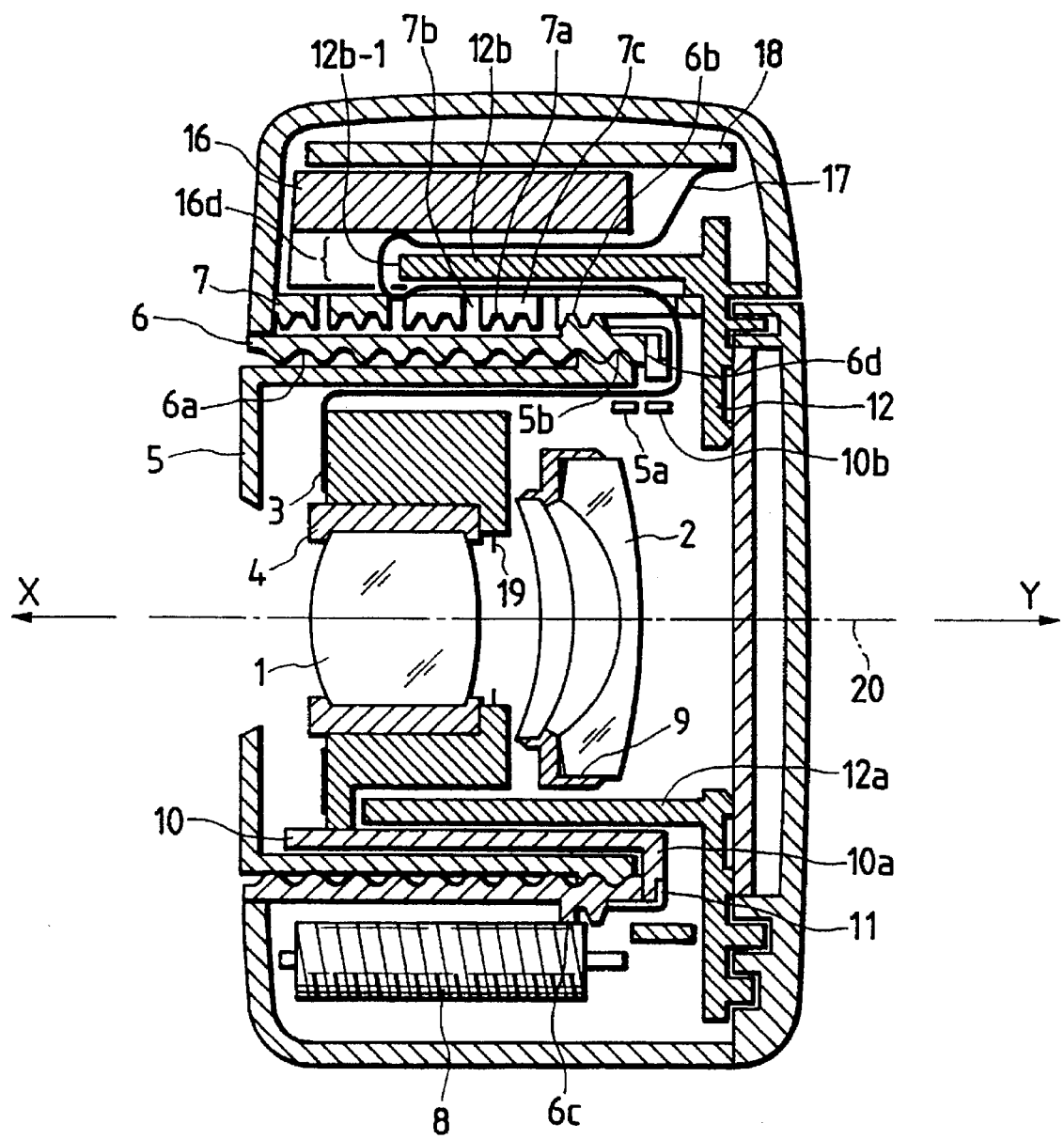
FIG. 2 is a schematic sectional view showing the lens shutter camera of FIG. 1 in the collapsed condition.
Figure 3:
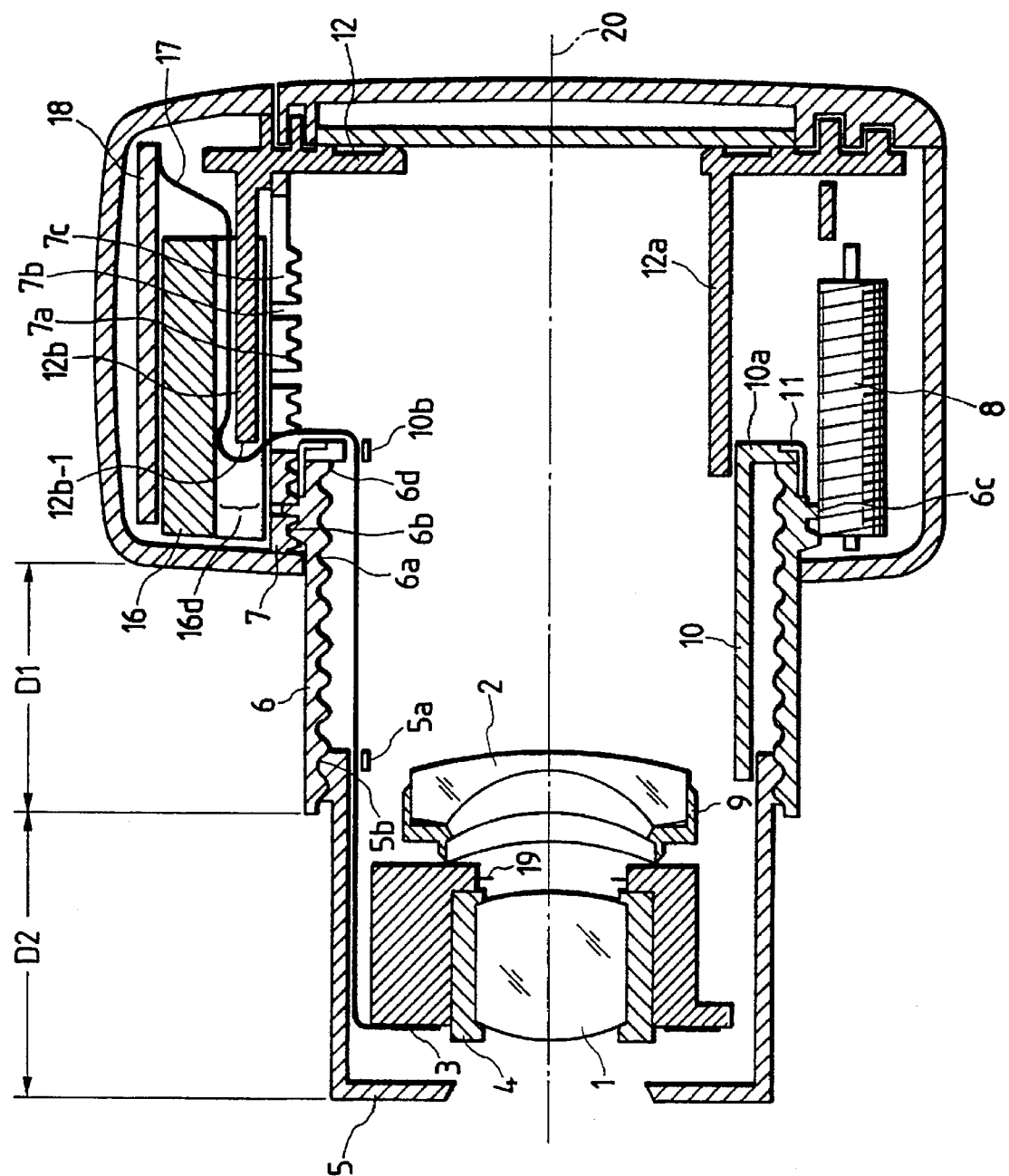
FIG. 3 is a schematic sectional view showing the lens shutter camera of FIG. 1 in the telescopic condition.
Figure 4:
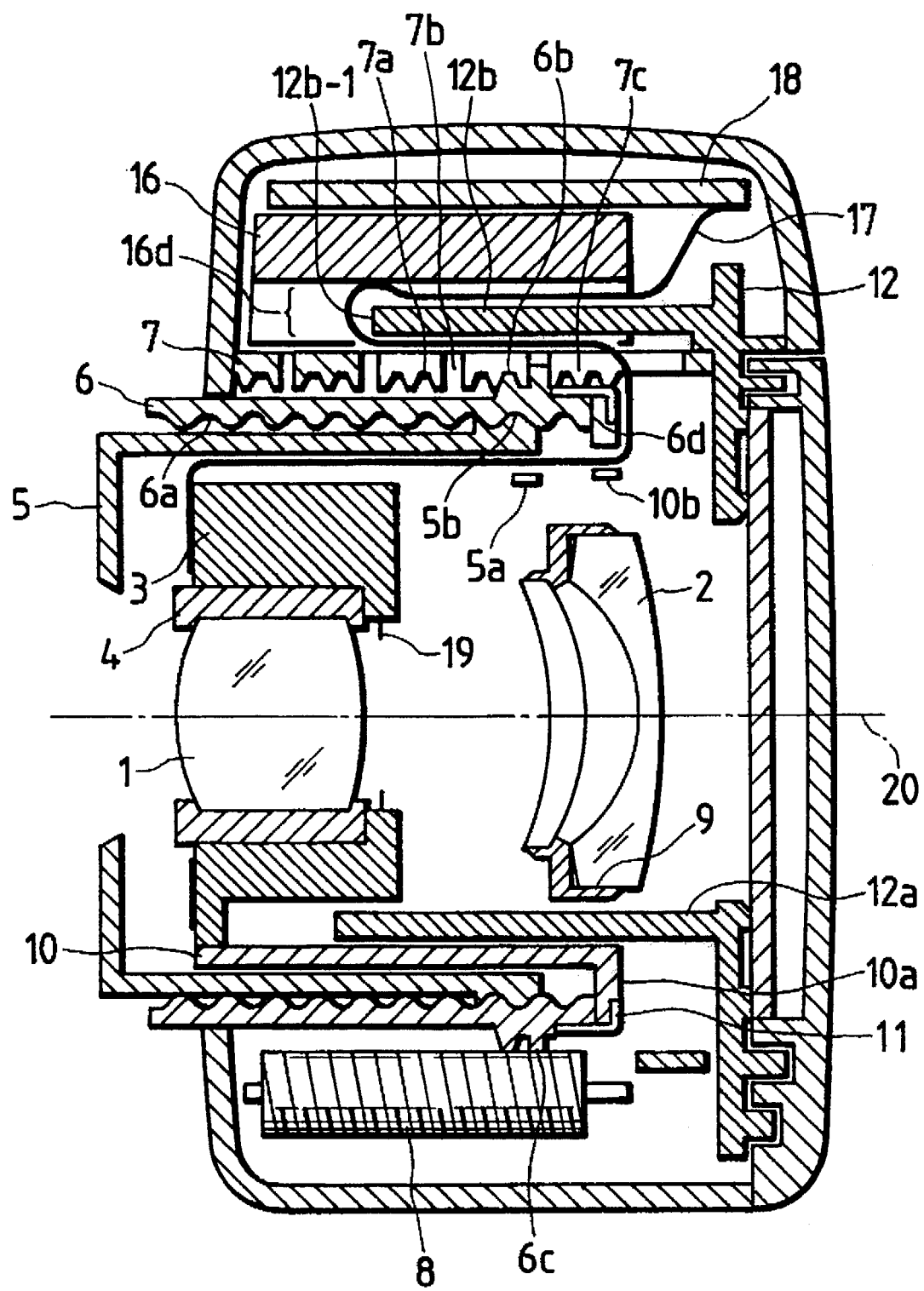
FIG. 4 is a schematic sectional view showing the lens shutter camera of FIG. 1 in the wide-angle condition.

Embodiments of the present invention will be described with reference to the accompanying drawings. FIG. 1 is a schematic front view of a lens shutter camera according to an embodiment of the present invention. The lens shutter camera is a collapsible mount type compact camera. FIGS. 2 to 4 are sectional views of the lens shutter camera in the collapsed condition, the wide-angle end condition and the telescopic end condition respectively.

In FIGS. 1 to 4, the lens barrel is a two group lens type of a rear focusing system. Then, in a zooming operation, the position of a first lens 1 is detected and a second lens 2 is shifted in accordance with the detection results. The second lens 2 has its own motor (not shown).

The first lens 1 is held by a holding frame 4. A shutter unit 3 is mounted to the holding frame 4 and serves to open and close a shutter blade 19.

The second lens 2 is held by a holding frame 9. The holding frame 9 supports a feed screw (not shown) and a guide shaft (not shown) disposed in the vicinity of the feed screw. The feed screw and the guide shaft are supported so as to be parallel to an optical axis 20.

The shutter unit 3 is provided therein with a male screw (not shown) for engagement with the feed screw. The second lens 2 is shifted in the direction of the optical axis 20 by rotating the male screw.

The lens barrel has a lens holding cylinder 5, an intermediate helicoid cylinder 6 and a stationary cylinder 7.

The lens holding cylinder 5 supports the shutter unit 3 and has a male helicoid 5b on a portion of its outer surface.

The intermediate helicoid cylinder 6 has a female helicoid 6a provided on its inner surface, a male helicoid 6b provided on a portion of its outer surface, a gear 6c and an edge portion 6d.

The stationary cylinder 7 is fixed to a main body 12 and has a female helicoid 7a and an escape portion 7b provided on its inner surface.

The male helicoid 5b is engaged with the female helicoid 6a and the male helicoid 6b is engaged with the female helicoid 7a. Also, the female helicoid 6a and the male helicoid 6b have the same lead and the lead angles of both helicoids 6a, 6b are in a positive and negative relationship The gear 6c of the intermediate helicoid cylinder 6 is formed every few threads along the lead of the male helicoid 6b. The gear 6c is higher than the male helicoid 6b in height and is engaged with a gear 8 (the helicoid 6b and the gear 6c are partially shown in the drawings). The gear 8 is mounted to the stationary cylinder 7 or the main body 12. The edge portion 6d supports a screw ring 11 and a direct advance key 10. The escape portion 7b of the stationary cylinder 7 is provided so as to prevent the stationary cylinder 7 from interfering with the gear 6c.

The advance key 10 is supported by the intermediate helicoid cylinder 6 and a bent portion 10a thereof is engaged with a guide key 12a projected from the main body 12. The direct advance key 10 can be moved in the optical axis direction together with the helicoid cylinder 6 but rotation thereof is prevented by the guide key 12a. The lens holding cylinder 5 is engaged with the direct advance key 10 and its rotation is prevented.

An AF block 16 and a control plate 18 for controlling the shutter unit 3, etc. are supported by the main body 12 over the stationary cylinder 6. In FIG. 1, the AF block is constituted of an AE optical section 16a, AF light emitting and receiving sections 16b, 16c.

A flexible plate 17 connects the shutter unit and the control plate 18 electrically and a control signal from the control plate 18 is replayed to the shutter unit 3.

In FIG. 2, the flexible plate 17 passes a through hole 5a provided in the lens holding cylinder and a through hole 10b provided in the direct advance key 10 within the lens holding cylinder 5. Then, it passes an opening portion 7c which is provided in the stationary cylinder 7 from a portion close to ends of the lens holding cylinder 5 and the intermediate helicoid cylinder 6 on the image plane side (on the right side in the drawing). Further, within a passage 16 provided between the AE optical section 16a and the AF light receiving section 16b, the flexible plate 17 is turned down along the guide 12b in the vicinity of tip portion 12b-1 of the Guide 12b, passes a space between the guide 12b and the AF block 16, and is connected to the control plate 18.

In FIG. 1, the containing section 16d is provided in a position displaced slightly to the left from a position above the lens barrel approximately corresponding to the optical axis 20. The AF block 16 is constituted of the AE optical section 16 and the AF light emitting and receiving sections 16b, 16c.

The AE optical section 16a is for performing photometry in the object field and is disposed in a position slightly displaced to the right from the position above the lens barrel corresponding to the optical axis 20.

An LED provided in the AF light emitting section 16b emits infrared light to an object and its reflected light is received by the AF light receiving section 16c. That is, the AF light emitting and receiving sections 16b, 16c are an active type and are disposed so as to interpose the containing section 16d for the flexible plate 17 and the AE optical section 16a between them. Therefore, the base length between the AF light emitting and receiving sections 16b, 16c is the same as or longer than that between the conventional light emitting and receiving sections (FIG. 8).

Figure 8:
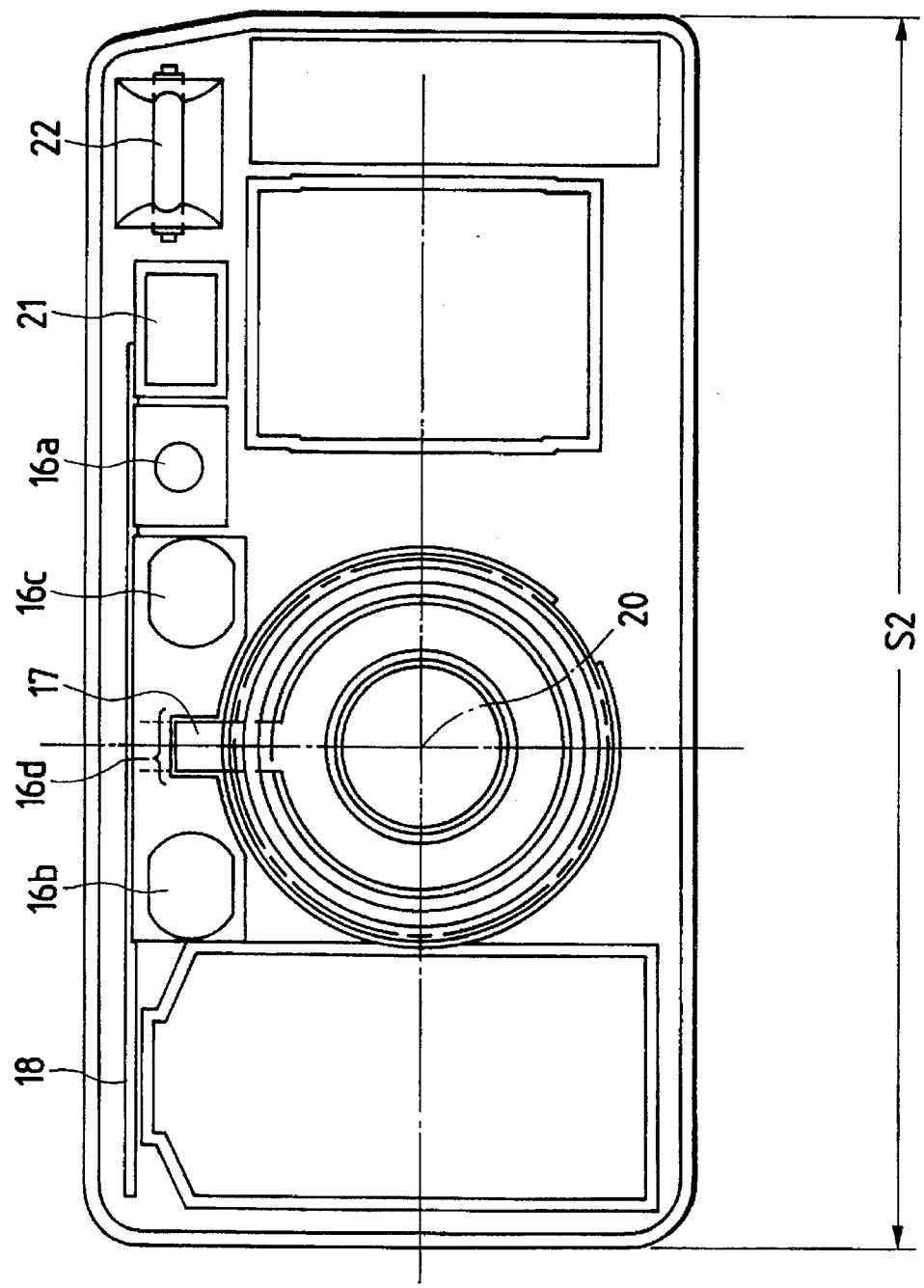
FIG. 8 is a schematic front view showing the structure of a conventional lens shutter camera.

On the other hand, the breadth S1 of the camera becomes shorter than the breadth S2 of the conventional camera in FIG. 8 for an amount corresponding to that the AE optical section 16a is not disposed outside the AF light emitting and receiving sections 16b, 16c.

Also, if the breadth S1 is set the same as the breadth S2, the base length between the AF light emitting and receiving sections 16b, 16c can be lengthened, which can improve performance of the AF light emitting and receiving sections 16b, 16c.

When the gear 8 is rotated clockwise by a motor as drive means controlled by control means with a photo-interrupter from the collapsed condition in FIG. 2, the intermediate helicoid cylinder 6 is shifted in the X direction along the lead of the stationary cylinder 7 while rotated. Further, the direct advance key 10 is slid in the direction of the optical axis 20 together with the intermediate helicoid cylinder 6.

Also, as the lens holding cylinder 5 is prohibited from rotating by means of the guide key 12a and the direct advance key 10, it is slid in the X direction along the lead of the female helicoid 6a. As seen as the first lens 1 is shifted to be in the wide-angle condition of FIG. 4, the drive of the drive means is stopped by the control means.

When the motor of the drive means is further rotated from this wide-angle condition, the intermediate helicoid 6 and the lens holding cylinder 5 are shifted further in the X direction to be in the telescopic condition of FIG. 3. In the telescopic condition, the position of the tip 12b-1 of the guide 12b approximately coincides with that of the through hole 10b of the direct advance key 10 in the direction of the optical axis 20.

As the camera is changed from the collapsed condition into the wide-angle condition and further into the telescopic condition, the distance between the shutter unit 3 and the through hole 10b of the direct advance key 10 is increased.

The lead between the stationary cylinder 7 and the intermediate helicoid 6 is approximately identical to that between the intermediate helicoid cylinder 6 and the lens holding cylinder 5.

Therefore, the distance between the tip 12b-1 of the guide 12b and the through hole 10b of the direct advance key 10 is decreased for the increased amount of the distance between the shutter unit 3 and the through hole 10b of the direct advance key 10b, so that the length of the route of the flexible plate 17 between the shutter unit 3 and the tip 12b-1 of the guide 12b is constant in the collapsed, wide-angle and telescopic conditions. Thereby, in either condition, the flexible plate 17 will not be slackened or pulled tightly between the shutter unit 3 and the control plate 18.

When the motor of the drive unit is rotated counterclockwise, the lens barrel is returned from the telescopic condition to the wide condition and further to the collapsed condition. At this time, due to an opposite operation to the above operation, a portion of the flexible plate 17 is disposed between the tip 12b-1 of the guide 12b and the through hole 10b of the direct advance key 10 within the containing section 16d for a decreased amount of the distance between the shutter unit 3 and the through hole 10b of the direct advance key 10.

As a pair of range finding sections, the active type light emitting and receiving sections 16b, 16c are described in the above embodiment, but they may be a passive type. In the passive type, the sunlight reflected from the object enters a pair of range finding lenses and forms images on a sensor array, by which the distance information is obtained.

Figure 5:
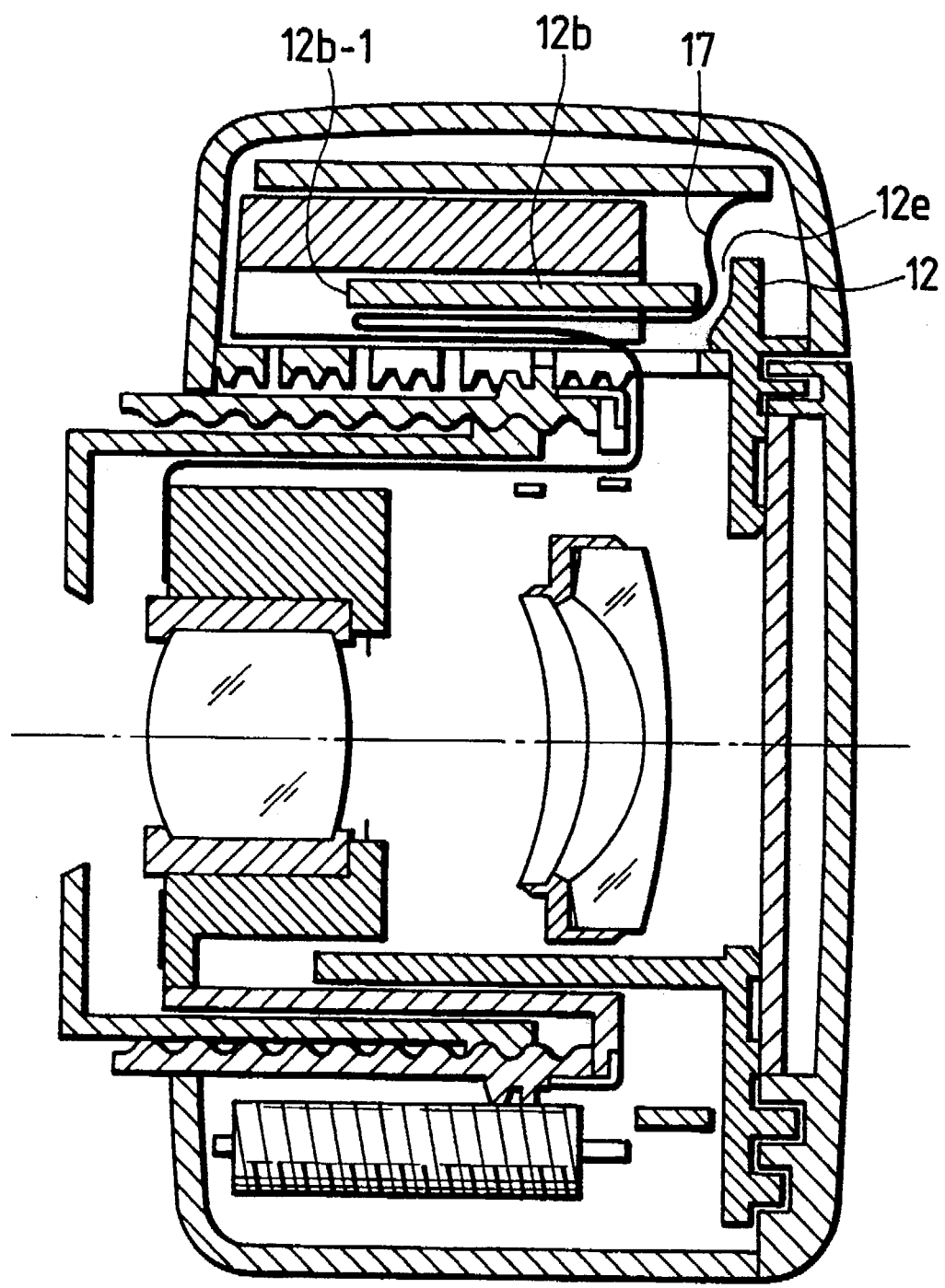
FIG. 5 is a schematic sectional view showing the structure of a lens shutter camera with a lens barrel according to a second embodiment of the present invention in the wide-angle condition.

FIG. 5 is a sectional view of a lens shutter camera with a lens barrel according to a second embodiment of the present invention in the wide-angle condition. The description of the structure the same as in the first embodiment will be omitted and only the structure different from that of the first embodiment will be described hereinafter.

A through hole 12e is formed between the main body 12 and the guide 12b. The flexible plate 17 goes back and forth under the guide 12 via the tip 12b-1 of the guide 12b. Then, it passes the through hole 12e and is connected to the control plate 18.

Figure 6A:
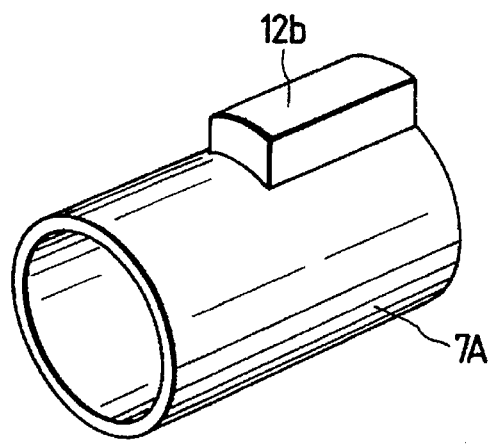
FIGS. 6A to 6C are schematic views showing a lens barrel according to a third embodiment of the present invention.
Figure 6B:
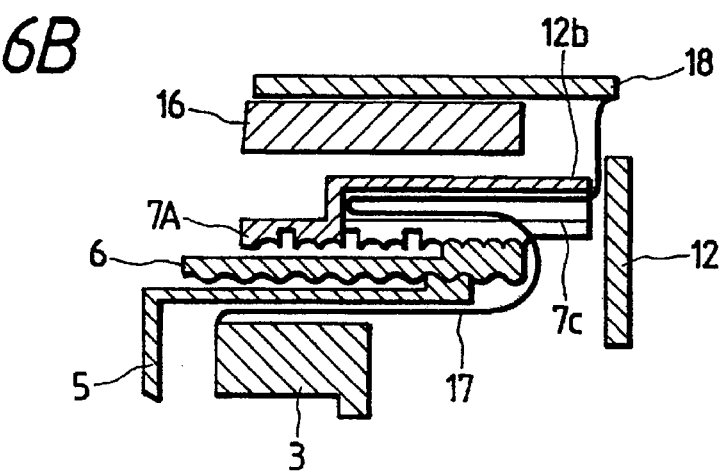
Figure 6C:
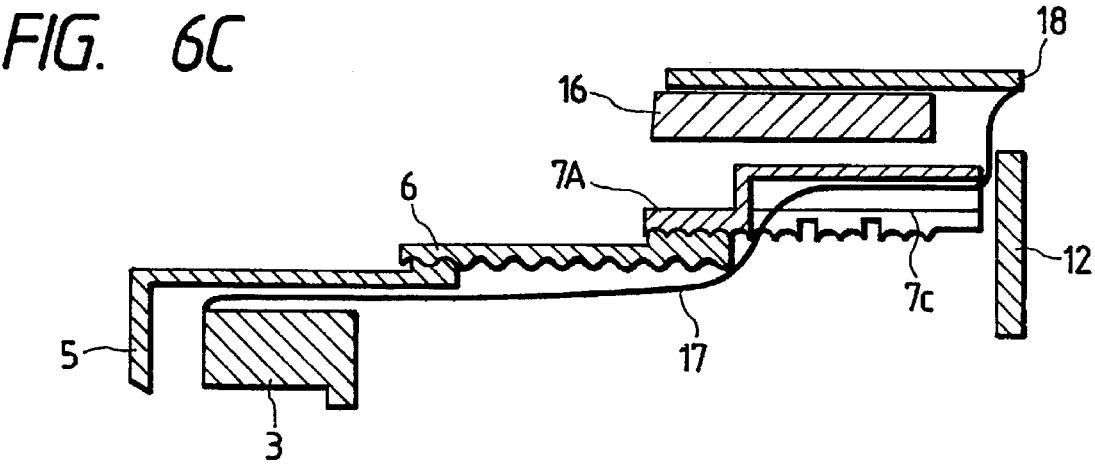
Figure 7A:
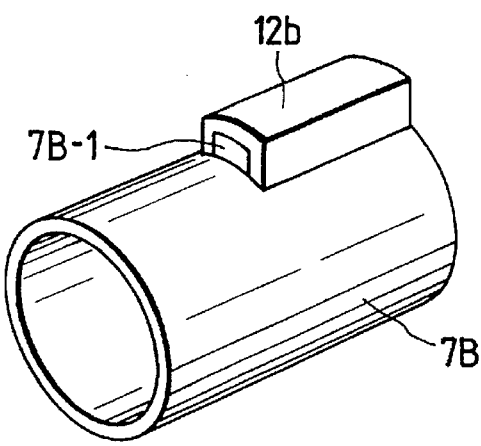
FIGS. 7A to 7C are schematic views showing a lens barrel according to a fourth embodiment of the present invention.
Figure 7B:
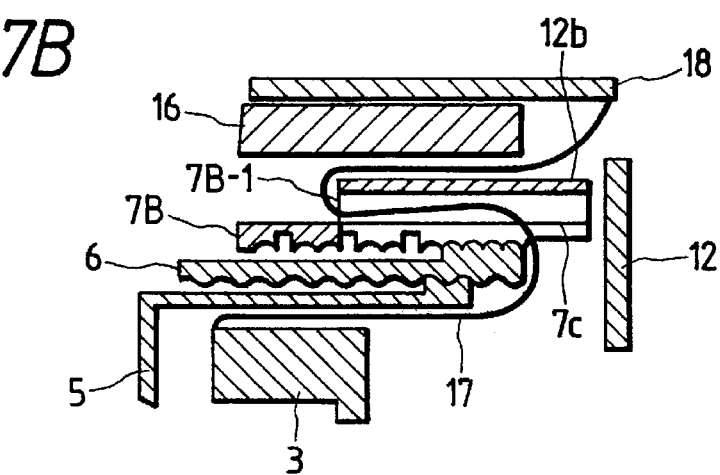
Figure 7C:
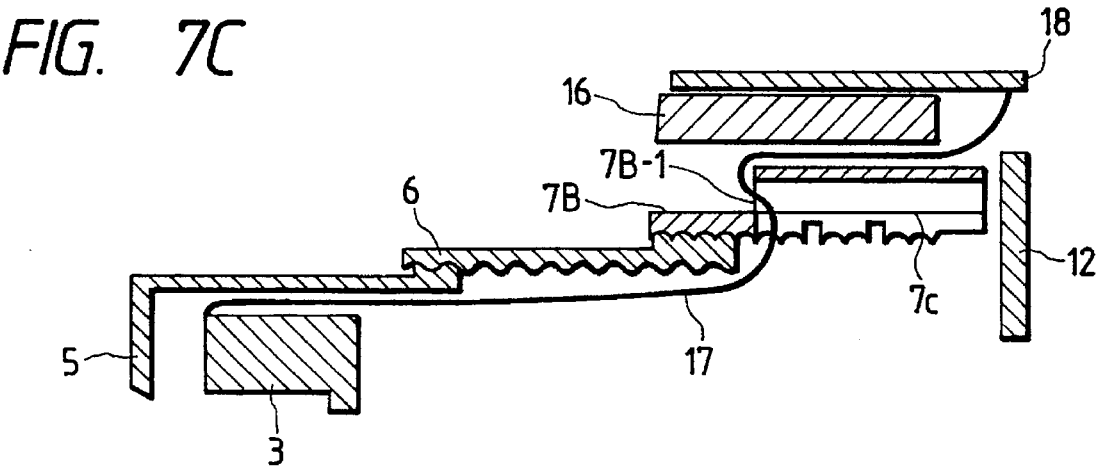

FIGS. 6A to 6C and FIGS. 7A to 7C show lens barrels of third and fourth embodiments of the present invention. FIGS. 6A, 7A are perspective views of outer cylinders. FIGS. 6B, 7B are partial sectional views showing the lens barrels in the wide-angle condition. FIGS. 6C, 7C are partial sectional views showing the lens barrels in the telescopic condition.

An outer cylinder 7A of FIGS. 6A to 6C is formed with the opening portion 7c in the same manner as in the first embodiment. The guide 12b is formed integrally with the outer cylinder 7A so as to cover the opening portion 7c. An opening is formed between the outer cylinder 7A and guide 12b on the film surface side. The flexible plate 17 passes the opening portion 12c of the outer cylinder 7A, goes back and forth in a space between the outer cylinder 7A and the guider 12b, and is connected to the control plate 18 via the opening between the outer cylinder 7A and the guide 12b and the space between the outer cylinder 7A and the main body 12.

An outer cylinder 7B of FIGS. 7A to 7C is formed integrally with the guide 12 in the same manner as in FIGS. 6A to 6C. Further, an opening 7B-1 is formed between the outer cylinder 7B and the guide 12b on the object side. The flexible plate 17 passes the opening portion 7c of the outer cylinder 7B, the opening 7B-1 and a space between the AF block 16 and the upper surface of the guider 12b, and is connected to the control plate 18.

According to the structures of the second to fourth embodiments, the same effect as in the first embodiment can be obtained.

The present invention is applied to the collapsible mount type compact zoom camera in the above embodiments, but may be applied to an interchangeable lens of a single-lens reflex camera. In this case, the guide 12b and the control plate 18 are formed on a cover, etc. provided outside an outer cylinder.

For easy understanding of the route of the flexible plate 17, the dimensions of the passage 16d are exaggerated in the drawings, but this space can be further reduced if the flexible plate 12b is formed of a thin board, etc. Also, if the flexible plate 17 is adhered to the lower surface of the AF block, substantially no space is formed between the guide 12b and the AF block 16.

According to the lens shutter camera of the present invention, the breadth of the camera can be reduced for its miniaturization without shortening the base length between a pair of range finding sections. Also, when the breadth of the camera is set the same as that of the conventional camera, the base length of a pair of range finding sections can be lengthened, making it possible to improve performance of the range finding sections.

According to the lens barrel of the present invention, since the length of the route of the electric plate from the inside of the inner cylinder to the outside of the outer cylinder is not changed due to a zooming or collapsing operation, there is no need to provide a space for containing the slackened electric plate. Thereby, miniaturization of the lens barrel or the camera can be achieved.

Further, as the electric plate is disposed always in the constant position, it is possible to prevent an excessive load from being applied to the electric plate in the wide-angle and collapsed conditions.

What is claimed is:

1. A lens shutter camera, comprising:

a pair of range finding sections for obtaining distance information;

a light measuring section performing photometry of an object, which light measuring section is disposed between said pair of range finding sections;

an outer cylinder and an intermediate cylinder intermediately forming an opening portion;

a flexible printed circuit plate being partially located in said opening portion, said opening portion being located between said pair of range finding sections; and a shutter section located inside a lens barrel and a control section located outside said lens barrel which are being electrically connected by the flexible printed circuit plate.

2. A lens barrel of a lens shutter camera, comprising:

an outer cylinder having an opening portion being longitudinally positioned in parallel with an optical axis;

an intermediate cylinder located inside of said outer cylinder sharing a concentric axis, said intermediate cylinder being shifted with respect to said outer cylinder along the concentric axis;

an inner cylinder supporting a photographic optical system and being positioned inside of said intermediate cylinder sharing the concentric axis, said inner cylinder being shifted relatively with respect to said intermediate cylinder along the concentric axis, a shifting distance between the inner cylinder and the intermediate cylinder being approximately identical to a shifting distance between the intermediate cylinder and the outer cylinder; and an electric plate connecting an element inside of said inner cylinder and an element outside of said outer cylinder, said electric plate passing an area located between an end portion of said intermediate cylinder and an image plane.

3. A lens barrel according to claim 2, wherein said electric plate passes an edge of said image plane when said intermediate cylinder is projected maximally.

4. A lens barrel according to claim 3, further comprising a space located between a guide portion and said opening portion of said outer cylinder, said electric plate passing said space.

5. A lens barrel according to claim 4, wherein said electric plate passes the space located between the guide portion and an opening portion of said outer cylinder.

6. A lens barrel according to claim 5, wherein said electric plate is connected to a control plate outside of said outer cylinder.

7. A lens barrel, comprising:

an inner cylinder, an intermediate cylinder and an outer cylinder sharing a concentric axis, and positioned within each other, respectively;

wherein the lens barrel is extendable in length by sliding the inner, intermediate and outer cylinders relative to each other along the concentric axis without being separated from each other; and wherein once the lens barrel is fully extended, a protruded length of the inner cylinder is approximately equivalent to a protruded length of the intermediate cylinder.

8. A camera, comprising:

an inner cylinder, an intermediate cylinder and an outer cylinder sharing a concentric axis and positioned within each other, respectively; and a flexible printed circuit plate having a first terminal connected to a portion of the camera located outside the outer cylinder and a second terminal connected to a portion of the camera located inside the inner cylinder.

9. A camera, comprising:

a pair of range-finders located a distance apart from each other;

an automatic exposure sensor located within the distance between the pair of range-finders;

an outer cylinder and an intermediate cylinder intermediately forming an opening portion; and a flexible printed circuit plate partially located in the opening portion, which opening portion is located within the distance between the pair of range-finders.

10. A lens barrel of a lens shutter camera, comprising:

an outer cylinder having an opening portion longitudinally positioned in parallel with an optical axis;

an intermediate cylinder located inside of said outer cylinder sharing a concentric axis, said intermediate cylinder being shifted with respect to said outer cylinder along the concentric axis;

an inner cylinder supporting a photographic optical system and being positioned inside of said intermediate cylinder sharing the concentric axis, said inner cylinder being shifted relatively with respect to said intermediate cylinder along the concentric axis, a shifting distance between the inner cylinder and the intermediate cylinder being approximately identical to a shifting distance between the intermediate cylinder and the outer cylinder; and an electric plate connecting an inside of said inner cylinder and an outside of said outer cylinder, said electric plate passing an area close to an end portion of said intermediate cylinder on the side of an image plane and said opening portion of said outer cylinder, and being turned down at a substantially same position with respect to the optical axis direction, as an area close to an end of the intermediate cylinder on the side of the image plane when the intermediate cylinder is projected maximally, said electric plate passing again said opening portion.

11. A lens barrel according to claim 10, further comprising a guide portion having a space facing said opening portion of said outer cylinder, said electric plate passing said space.

12. A lens barrel according to claim 11, wherein said electric plate passes a position of said end portion, which position corresponds to said area close to said end portion on the side of said image plane in said guide portion.

13. A lens barrel according to claim 12, wherein said electric plate is connected to a control plate disposed in the outside of said outer cylinder.

* * * * *